W. M. EVANS ET AL 2,708,985

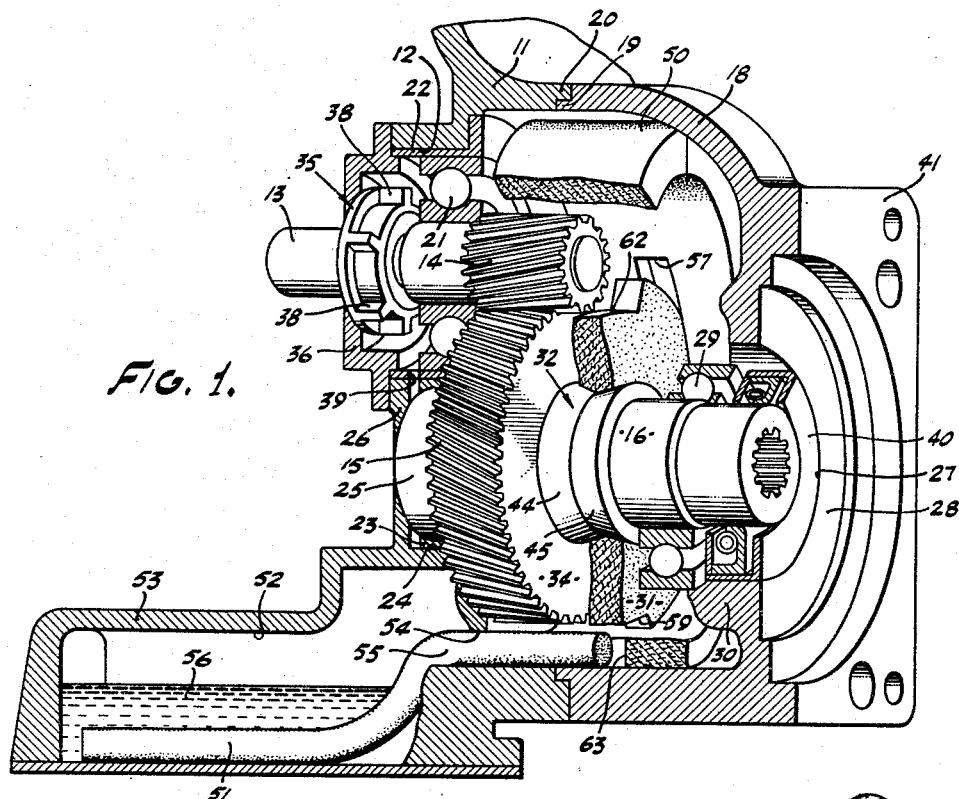
FIG. 1.
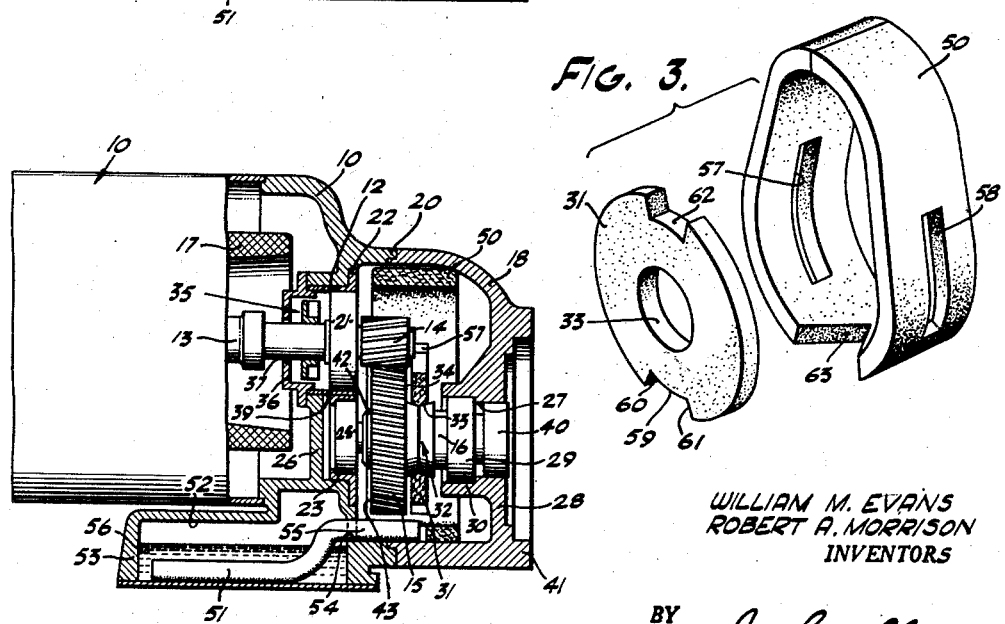
FIG. 2.
FIG. 3.
WILLIAM M. EVANS
ROBERT A. MORRISON
INVENTORS
BY John Flam
ATTORNEY May 24, 1955

LUBRICATION SYSTEM

Filed Sept. 11, 1952

WILLIAM M. EVANS
ROBERT A. MORRISON
INVENTORS

BY John Flam

ATTORNEY

United States Patent Office 2,708,985
Patented May 24, 1955

2,708,985

LUBRICATION SYSTEM

William M. Evans, La Habra Heights, and Robert A. Morrison, San Gabriel, Calif., assignors to U. S. Electrical Motors, Inc., Los Angeles, Calif., a corporation of California Application September 11, 1952, Serial No. 309,113

15 Claims. (Cl. 184—11)

This invention relates to a lubrication system for gears, bearings, and the like, and particularly to a lubricating system for high speed motors and transmissions.

It is an object of this invention to provide an improved lubricating system that applies a fine mist of oil to gears and bearings. For this purpose, a wick feed system is employed from which oil is distributed to the gears and bearings by contact with rotating parts. As such oil comes in contact with high speed mechanisms, it is broken into smaller particles, and surrounds the high speed mechanism as a mist. The oil mist is then condensed, and recirculated by the wick.

It is an object of this invention to provide a lubricating system of this general character in which a wick system forms a part, and in which the oil is continuously filtered and cooled as the system is in operation.

It is another object of this invention to provide an improved lubricating system utilizing a reservoir cooperating with a wick, and in which no seal is required for the reservoir apart from the wick with which it cooperates. For this purpose, the wick, where it enters the reservoir, is closely confined, such that the wick itself operates as a seal.

It is another object of this invention to provide a lubricating system of this general character cooperable with a high speed mechanism, and in which a separate reservoir is provided that is out of communication with the parts intended to be lubricated.

It is another object of this invention to provide a system of this character in which the mechanism can assume substantially any orientation, without impairing the effectiveness of the system or the uniform lubrication of parts. For this purpose, reliance is placed on apparatus independent of gravity to secure circulation of oil through the system.

It is another object of this invention to provide a lubricating system for bearings and gears in which the housing or casing for the gears and bearings need not be sealed, thereby greatly simplifying the manufacture of the mechanism.

It is another object of this invention to provide a wick feed lubricaton system in which a simple and inexpensive wick can be easily replaced to restore the complete effectiveness of the system.

It is another object of this invention to provide a system of this character that is especially adapted for use in connection with high speed mechanisms for aircraft installations.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a schematic pictorial representation of a part of apparatus incorporating the present invention;

Fig. 2 is an elevation, partly in section, illustrating the apparatus of Fig. 1;

Fig. 3 is a pictorial view of the wick or oil feeding structure that forms a part of the present invention.

Figure 4:
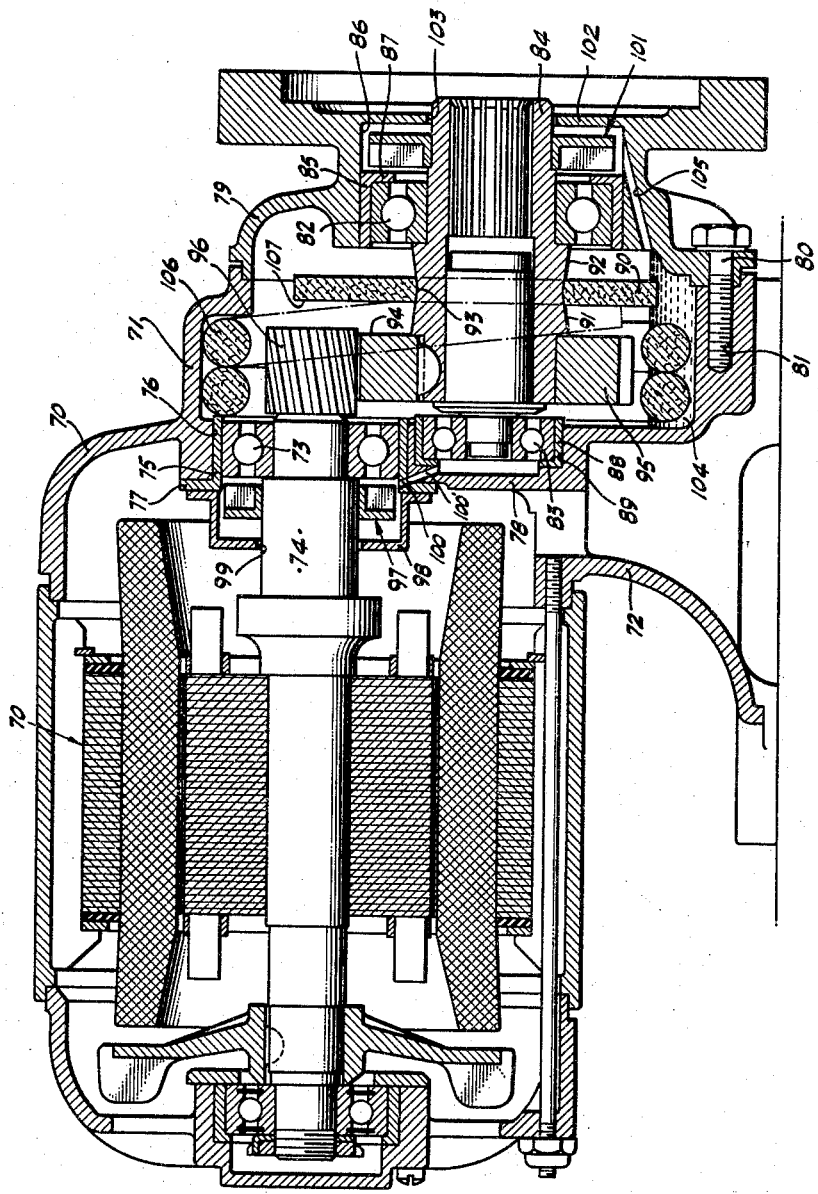
Fig. 4 is a longitudinal sectional view of a motor incorporating a modified form of this invention.

In the forms illustrated in Figs. 1 to 3, a load (not shown) is intended to derive motion from a high speed motor 10. This motor may be of a type suitable, for instance, in aircraft installations. A housing 11 encloses the motor and provides an appropriate aperture 12 through which the shaft 13 of the motor may extend.

A pinion gear 14 is carried by the end of the motor shaft 13 for cooperation with a spur gear 15 that is carried for rotation on a driven shaft coupling member 16. The pinion 14 and gear 15 comprise a simple reduction gearing that is enclosed in a space separate from the motor windings 17 by the aid of a supplemental bracket 18. This supplemental bracket is suitably secured to the motor housing proper by the aid of an annular flange 19 telescopingly received by a corresponding flange 20 of the motor housing 11. The bracket 18 is appropriately bolted to the motor housing 11 in a conventional manner.

The shaft member 16 may be of two-part telescoping construction, one of the parts having a flange 42 engaging the left-hand side surface 43 of the spur gear 15 to restrain the latter against axial movement from the other shaft part.

Suitable bearing structures are provided to mount the motor shaft 13 and driven shaft member 16 in spaced parallel relationship for appropriate operation of the gear reduction mechanism 14, 15. For this purpose, a ball bearing structure 21 for shaft 13 is accommodated near the end of this shaft 13 and conveniently supported by the aid of a flanged sleeve 22 received in the aperture 12 of the motor casing 11.

A sleeve 23 is accommodated in a recess 24 beneath and adjoining the aperture 12. A bearing structure 25 for the left-hand end of the driven shaft member 16 is accommodated in the sleeve 23, the bearing structure 25 being spaced from the bottom wall 26 of its recess 24.

The supplementary bracket 18 has an aperture 27 in its end wall 28 in which the driven shaft member 16 extends. Accordingly, the shaft member 16 communicates exteriorly of the bracket 18 for cooperation with the load. A bearing structure 29 surrounds the driven shaft member 16, and is accommodated against a shoulder formed by an enlarged portion of the recess 27 that is provided by an inwardly extending boss 30 formed on the wall 28. A flange 41 about the end wall 28 of the bracket 18 facilitates attachment of the motor 10 and bracket 18 directly to the housing of the load.

Lubricant, intended to be distributed to the gear structures 14, 15 as well as the bearings 21, 25, and 29, is primarily derived from a disc wick 31. This wick 31 is intended to be saturated with a low viscosity lubricant in a manner to be hereinafter described.

The disc wick 31, as well as other wick structures that will be described hereinafter, may be formed of a felt-like or other absorbent material. The wick 31 is mounted adjacent, and axially spaced from, the spur gear 15. For this purpose, a lubricant distributor member 32, carried for rotation by the shaft coupling member 16, projects through a central aperture 33 of the disc wick 31. The distributor member 32 may be integrally formed on the shaft coupling member 16.

The lubricant distributor member 32 is in intimate contact with the edge forming the aperture 33 of the wick 31. The disc wick 31 deposits a thin film of lubricant throughout its area of contact with the distributor member 32. This film of lubricant is urged axially and radially outwardly by tapered annular peripheral surfaces of the distributor 32 that engage the disc edge 33. Such movement of lubricant is greatly enhanced by providing relative rotation between the disc 31 and the distributor 32. The manner in which the disc is held against rotation will be described more fully hereinafter. These tapered surfaces are inclined with respect to the axis of rotation of the shaft coupling member 16, and are formed by intersecting frusto-conical surfaces 44 and 45, providing a seat for the disc 31. The distributor member 32 causes the film of lubricant deposited on it by the disc 31 to move axially and radially outwardly by virtue of the rotation imparted to such film through the angular rotation of the distributor member 32. If the disc 31 is maintained in saturated condition, the film at the area of contact with the distributor member 28 is constantly replenished so that a small metered amount of lubricant is continuously passed from the wick 31.

The left-hand surface of the distributor 32 abuts the adjacent side surface 34 of the spur gear 15. Lubricant is thus brought into contact with this side surface. Rotation of the spur gear 15 causes the lubricant to move outwardly of the axis of rotation of the spur gear by centrifugal force.

The pinion gear 14 projects beyond the side surface 34 of the spur gear so that the teeth of the pinion gear 14 are in the direct radial path of movement of some of the lubricant. As the lubricant so comes into contact with the high speed pinion 14, it is immediately broken up into very fine particles or globules by sudden turbulence.

The lubricant forms a mist surrounding the gear structures 14 and 15. Some mist particles condense on the rotary structures, thereby providing lubrication. Other particles condense upon the disc wick 31. The mist, however, is continuously being formed if the disc wick 31 is continuously maintained in saturated condition.

The fine particles of lubricant enter between the inner and outer recesses of the bearings 21 and 29, thereby providing necessary lubrication therefor. Some of the lubricant may pass axially through the bearings 21 and 29.

In order to ensure that the lubricant is contained essentially within the space provided by the bracket 18, a slinger member 35 is rotated by the motor shaft 13, and attached to the shaft on the motor side of the bearing 21. This slinger 35 disrupts passage of lubricant axially of the motor shaft by urging the lubricant away from the rotary structure by centrifugal force. A rubbing seal can thus be obviated.

A cup-shaped flanged bracket 36, telescopingly received by the sleeve 22 from the inside of the housing 11, provides a space in which the lubricant may collect. This cup 36 has an aperture 37 of small clearance for the motor shaft 13. The slinger 35 is disposed within the space provided by the bracket 36. A plurality of radially extending ribs or fins 38 of the slinger 35 urge whatever lubricant may pass beyond the bearing 21 radially outwardly to impinge it against the walls of the bracket 36. The excess lubricant is thus collected. The blades or ribs 38 have substantial clearance with respect to the interior surface of bracket 36.

A port 39 in the upper bracket mounting sleeve 22 permits the collected lubricant to pass within the sleeve 24 mounting the bearing 25. Accordingly, the bearing 25 is provided with a continuous small supply of lubricant.

A seal structure 40, of any suitable construction, is provided for preventing passage of lubricant axially of the driven shaft member 16 beyond the bearing 29.

In order to maintain a continuous saturated condition for the disk wick 31, a wick system, comprising a liner wick 50 and a feeder wick 51, is employed.

The feeder wick 51 extends into a chamber 52 formed by the walls 53 of the motor casing. For this purpose, an appropriate aperture 54 permits access between the chamber 52 and the space provided by the supplementary bracket 18. The feeder wick 51 is of a size slightly in excess of the aperture 54, and it extends therethrough. This aperture 54 is so located that one end 55 of the feeder wick extends beneath both the spur gear and the disc wick 31. The other end of the feeder wick 51 extends into the chamber 52, in which is provided a body of lubricant 56. The wick 51 is thereby maintained in saturated condition. The close fit of the wick 51 with the aperture 54 ensures a sealed relationship of the chamber 52, and permits passage of lubricant only through the feeder wick 51, as by capillary attraction.

The liner wick 50 is of such size that it is in contact with the interior surface of the bracket 18, completely surrounding the gear reduction mechanism 14, 15, as well as the disc wick 31. The liner wick 50 may be formed of a strip of absorbent material, such as felt, with its ends in abutting relationship to form a continuous band. The liner wick has a pair of peripherally extending slots 57 and 58 that receive peripheral portions of the disc wick 31. A slot 59 of the disc wick forms opposed shoulders 60 and 61 that are engaged, respectively, by the end walls of the slots 57 and 58, thereby holding the disc wick 31 against rotation. Another slot 62, opposite the slot 59 of the disc wick 31, permits the end of the spur gear 14 to be exposed in the space provided by the bracket 18. More effective passage of the lubricant subdivided by the high velocity spur gear 14 is thus permitted.

The end 55 of the feeder wick 51 is in intimate engagement with a portion of the liner wick 50. For this purpose, the end 55 extends along the inner surface of the bracket 18, and is wedged in a V-shaped space provided by a notch 63 in the lower portion of liner wick 50.

The feeder wick 51 withdraws lubricant from the reservoir chamber 52. The liner wick 50, in turn, by intimate engagement with the end 55, draws lubricant from the feeder wick. Similarly, the disc wick 31 draws lubricant from the liner wick by intimate engagement of its peripheral portion with the liner wick 50.

Since the wick structures are exposed in the space formed by the bracket 18, some of the finely divided lubricant may collect upon these structures, thereby minimizing the amount of lubricant that must be withdrawn from the chamber 52 in order to maintain the disk wick 31 in saturated condition.

The liner wick 50 ensures against collection of liquid in the bracket 18, should the structure be inverted or tilted from the position shown. Thus, despite changes in the orientation of the structure, such as might be encountered in aircraft, or the like, the same controlled lubrication is effected.

The wick systems form a depositary for lubricant that has become oxidized. If a lubricant having low oxidation properties is used, the wick structures may be used for considerable periods of operation. When necessary, the bracket 18 may be removed, and replacement wick structures inserted.

In the form illustrated in Fig. 4, a lubrication system is provided in which lubricant in liquid form is collected in the bottom of the space in which the gear reduction mechanism is located.

A motor structure 70 is supported by the aid of an end bracket 71 that has feet 72 for attachment to a support, or the like. Bracket 71 mounts a ball bearing structure 73 for the right-hand end of a motor shaft 74. For this purpose, a flanged sleeve 75 is inserted in an aperture 76 extending about the axis of the motor shaft 74. The sleeve 75 has a flange 77 engaging a wall 78 of the bracket 71, and by the aid of which the sleeve may be secured.

The end bracket 71 for the motor 70 provides a space in which gear reduction mechanism can be accommodated, and in which the feeding mechanism for lubricating the apparatus is disposed. A supplementary bracket 79 cooperates with the end bracket 71 to define this space. The supplementary bracket 79 is carried by the end bracket 71 by the aid of a plurality of bolts 80 passing through peripheral portions of the supplementary bracket 79, and in engagement with tapped holes 81 of the end bracket 71.

The supplementary bracket 79 and the end bracket 71 mount suitable ball bearing structures 82 and 83 for a driven shaft coupling member 84. A sleeve 85 is accommodated in a recess 86 of the supplementary bracket 79. The bearing structure 82 is accommodated within the sleeve 85, and has its outer race in abutting relationship with an inwardly extending flange 87 of the sleeve 85. The bearing 83 is similarly carried by a sleeve 88 that is, in turn, mounted in a recess 89 of the end bracket 71. The bearing 83 is spaced from the wall 78 of the bracket 71.

A disc wick 90 provides a source of lubricant that is distributed by diverging frusto-conical surfaces 91 and 92 of the driven shaft 84. The disc wick 90 has an annular edge 93, forming a through aperture, in intimate engagement with the seat provided at the intersection of the surfaces 91 and 92.

The surface 92 urges the film of lubricant deposited upon it by the disc wick 90 upwardly toward the bearing structure 82, thereby providing sufficient lubrication for this bearing 82.

The other inclined surface 91 distributes lubricant to the adjacent lateral face 94 of a spur gear 95. This spur gear is suitably carried for rotation with the driven shaft member 84 by the aid of an appropriate key connection, or the like. The spur gear 95 is in engagement with a pinion gear 96 that is carried by the motor shaft 74.

The teeth of the pinion gear 96 project axially beyond the surface 94 so that the teeth of the pinion gear 96 are in the path of movement of some of the lubricant that is urged radially outwardly by centrifugal force on the gear side surface 94. Accordingly, substantially as disclosed in connection with the form illustrated in Figs. 1 to 3, the lubricant, upon such contact with the pinion 96, is caused to be broken up into fine particles or globules. The lubricant thus forms a mist in the space provided by the brackets 71 and 79. The lubricant in the subdivided form provides the required continuous small amounts of lubricant required for most efficient operation of the gear structures 95 and 96, as well as for the bearings 73 and 83.

Thus, some of the lubricant in finely divided form passes axially of the motor shaft 74 into, and lubricating, the bearing structure 73. Some of the lubricant may pass axially inwardly with respect to the motor. To ensure that the lubricant is collected and recirculated to the space provided by the brackets 71 and 79, a slinger 97 is provided.

Whatever lubricant passes inwardly of the bearing 73 is collected in a space provided by a cup-shaped member 98 that surrounds the slinger 97. This cup member 98 has an aperture 99 that has a limited amount of clearance with respect to the motor shaft 74. The lubricant so collected is passed to the bearing 83 for the driven shaft member by the aid of registering ports 100 and 100′ of the bearing sleeve 75 and wall 78. The port 100′ communicates with space between the wall 78 and the bearing 83, thereby providing small amounts of lubricant therefor.

A similar slinger 101 is provided beyond the bearing 85 for the right-hand end of the driven shaft member 84. An inwardly directed flange 102 of the supplementary bracket 94 has an aperture 103 that has a limited amount of clearance with respect to the driven shaft member 84. This flange 102 forms the end of the recess 86, and defines therewith a space in which the lubricant may be collected.

To maintain the wick 90 in substantially saturated condition, a body of lubricant 104 in liquid form is provided in the bottom of the space provided by the brackets 71 and 79. A portion of the periphery of the disc wick 90 extends below the level of the lubricant 104, thereby maintaining the wick in a saturated condition. A port 105 in the supplementary bracket 79 establishes communication between the space occupied by the liquid lubricant 104 and the collection chamber for the slinger 101.

A wick structure 106, formed of a plurality of turns of an elongate circularly cross-section absorbent material, lines the inner wall of the bracket 71. This wick structure 106 extends about the gear mechanisms 95 and 96. The terminal portions of the wick 106 are in engagement with one of the sides 107 of the disc wick 90, thereby holding the disc 90 against rotation. The lowermost portions of the several turns of the wick 106 are also immersed in the liquid lubricant 104 so that the wick 106 also serves as a source of lubricant supply to the disc 90, the liner wick 106 contacting the disc wick 90.

The lubricant is continuously subdivided by the action of the pinion 96. A portion of the mist collects on the wick structures 106 and 90; another portion may pass through the bearing 73 and thence, by the aid of the slinger 97, to the bearing 83. The lubricant from the bearing 83 can then pass back to the main body of lubricant 104. The frusto-conical surface urges lubricant to the bearing 82. A circulating lubrication system is thus provided, maintaining proper operating conditions for the bearings and gear structures.

The inventors claim:

1. In a lubricating system: a rotary member having an annular surface converging in one direction along the axis of rotation of said rotary member; a wick having an edge forming an aperture, the edge being in intimate engagement with said annular surface; means restraining said wick against rotary movement; a transmission including a gear element and a pinion element, the gear element having teeth and a side surface adjoining said teeth, said side surface extending substantially normal to the axis of rotation of said gear element and adjacent the divergent end of said annular surface; said pinion extending axially beyond said side surface of said gear element; and means continuously maintaining said wick substantially saturated with lubricant.

2. In a lubricating system: a housing forming a pair of chambers, one of said chambers being adapted to contain a body of lubricant, there being a ported wall between said chambers establishing communication therebetween; a rotary member in the other of said chambers, said rotary member having an annular surface formed of intersecting frusto-conical surfaces diverging in opposite outward directions from the axis of rotation of said rotary member, and forming an annular seat; a first absorbent element having an edge forming an aperture, the edge being in intimate engagement with said annular seat; a second absorbent element surrounding said first absorbent element and extending about the inner surface of said other chamber; said second element being in engagement with said first element for restraining said first element against rotary movement; and a wick structure extending through said port and closely accommodated therein, said wick structure being in engagement with at least one of said absorbent elements for maintaining said first element substantially saturated with lubricant.

3. In a lubricating system for rotary machinery: means forming a pair of chambers connected by an aperture; one of said chambers being adapted to contain a lubricant; rotary members in the other chamber; a first absorbent member in the other chamber for supplying lubricant to the rotary members; a second absorbent member extending about said rotary members and said first absorbent member, said absorbent members being in engagement; and a wick extending through the aperture and into the lubricant for feeding lubricant to one of said absorbent members, communication between the chambers being established only through the wick.

4. In a lubricating system: means forming a housing; a transmission having gear members exposed in the housing; one of said gear members having an annular portion; a first absorbent member in contact with the annular portion; a second absorbent member extending around the first absorbent member and in contact with said first absorbent member, said second absorbent member having a surface exposed in the housing and extending about said gear members; and means for supplying lubricant to the absorbent members.

5. In a lubricating system: a housing; a rotary mechanism including a pair of spaced rotary members exposed in the housing; bearing structures for said members; a first absorbent member in contact with one of the rotary members; a second absorbent member extending around the first absorbent member and in contact therewith, said second absorbent member also extending about said rotary members and having surfaces exposed in the housing; means for supplying lubricant to said absorbent members; and means passing lubricant from said first absorbent member to said one of said rotary members along a surface of the rotary member that extends transversely to the axis of rotation of the one rotary member for causing centrifugal force to divide said lubricant.

6. In a lubricating system: wall means forming a housing; a pair of rotary members extending in said housing; means rotatably coupling said rotary members; one of said rotary members having an annular surface converging in one direction along the axis of rotation of said one rotary member; a first absorbent member having an edge forming an aperture, the edge being in intimate engagement with said annular surface; a second absorbent member extending around the first absorbent member and in contact therewith, said second absorbent member lining an interior wall of said housing and having a surface exposed therein; and lubricant in the housing, said lubricant having a level such that portions of said absorbent members are immersed therein.

7. In a lubrication system: a housing; rotary gear members exposed in the housing; a first absorbent member in the housing and lining a substantial portion of the walls thereof and extending about said gear members; a second absorbent member in engagement with one of the gear members as well as in engagement with said first absorbent member; and means for supplying lubricant to the absorbent members.

8. In a lubrication system: a housing; a transmission in said housing, including a gear element having a lateral surface and a pinion element, said elements having interengaging teeth; the teeth of said pinion element extending axially beyond the teeth of said gear element and substantially beyond the peripheral portion of said lateral surface; and absorbent members for supplying lubricant in metered amounts to said lateral surface.

9. In a lubrication system: a housing; a transmission in said housing, including a gear element having a lateral surface and a pinion element, said elements having interengaging teeth exposed in the housing; the teeth of said pinion element extending axially beyond the teeth of said gear element and substantially beyond the peripheral portion of said lateral surface; absorbent members for supplying lubricant in metered amounts to said lateral surface; another absorbent member extending about and spaced from said elements and having a surface exposed in the housing; and means interconnecting the absorbent members for transfer of a liquid lubricant therebetween.

10. In a lubrication system: a housing; a transmission in said housing, including a gear element having a lateral surface and a pinion element, said elements having interengaging teeth exposed in the housing; the teeth of said pinion element extending axially beyond the teeth of said gear element and substantially beyond the peripheral portion of said lateral surface; absorbent members for supplying lubricant in metered amounts to said lateral surface; another absorbent member extending about and spaced from said elements and having a surface exposed in the housing; said absorbent members being in engagement with each other; wall means forming a lubricant reservoir; means forming a passage from said reservoir to said housing, said passage being the only means of communication between said housing and said reservoir; and a wick fitting in the passage and having portions in the housing and in the reservoir, that portion of the wick in the housing being in engagement with at least one of said absorbent members.

11. In a lubrication system: a housing; a transmission in said housing, including a gear element having a lateral surface and a pinion element, said elements having interengaging teeth exposed in the housing; the teeth of said pinion element extending axially beyond the teeth of said gear element and substantially beyond the peripheral portion of said lateral surface; absorbent members for supplying lubricant in metered amounts to said lateral surface; another absorbent member extending about and spaced from said elements and having a surface exposed in the housing; and means forming a lubricant reservoir in the housing, said absorbent members each having portions projecting into said reservoir.

12. In a lubrication system: a housing; a rotary member in the housing, and having an annular surface; a first absorbent member extending continuously about a wall of the housing and about said rotary member, said first absorbent member being exposed in the housing; said absorbent member having a plurality of slots; a second absorbent member having edges forming an aperture and engaging said annular surface; said second absorbent member having peripheral projections interfitting the slots of said first absorbent member to restrain said second absorbent member against rotation.

13. In a lubrication system: a housing; a rotary member in the housing; an elongate pad of absorbent material having its ends opposing each other to form a loop configuration, said rotary member extending through said pad, said pad lining a wall of said housing and exposed in the housing; said pad having a plurality of slots extending longitudinally of the pad and substantially arcuately about the axis of rotation of said rotary member; and an absorbent member of substantially disc configuration having an edge forming an aperture engaging said rotary member; the periphery of said absorbent member having means forming shoulders extending substantially radially of the member and engaging the ends of the slots of said pad for restraining angular movement of said absorbent member.

14. In a lubrication system: a housing; a rotary member in the housing, said member having an annular surface formed by intersecting oppositely inclined frusto-conical surfaces, said intersecting frusto-conical surfaces forming a seat extending annularly about the axis of rotation of said member; a gear element carried by the member laterally of the seat; a disc of absorbent material having an edge forming an aperture, the edge being accommodated on said seat; a coiled wick comprising a plurality of turns of yielding absorbent material, said wick extending about said gear element; said gear element and said wick being exposed in the housing; the end turn of said wick engaging the lateral surface of said disc to prevent rotation of said disc; and means for maintaining said disc substantially saturated with lubricant.

15. In a lubrication system: a housing; rotary gear members exposed in the housing; a first absorbent member in the housing and lining a substantial portion of the walls thereof and extending about said gear members; a second absorbent member in engagement with one of the gear members as well as in engagement with said first absorbent member; wall means forming a lubricant reservoir; means forming a passage from said reservoir to said housing, said passage being the only means of communication between said housing and said reservoir; and a wick fitting in the passage and having portions in the housing and in the reservoir, that portion of the wick in the housing being in engagement with at least one of said absorbent members.

UNITED STATES PATENTS

References Cited in the file of this patent

| | | |
|---|---|---|
| 1,858,404 | Louis | May 17, 1932 |
| 1,859,068 | Beach | May 17, 1932 |
| 1,890,844 | De Laval-Crow | Dec. 13, 1932 |
| 1,986,040 | Buhler | Jan. 1, 1935 |
| 1,988,440 | Cotterman | Jan. 22, 1935 |
| 2,063,673 | Haley | Dec. 8, 1936 |
| 2,308,513 | Ioannilli | Jan. 19, 1943 |
| 2,524,555 | Willits | Oct. 3, 1950 |